(12) United States Patent  
Chang et al.

(10) Patent No.: US 7,649,569 B2
(45) Date of Patent: Jan. 19, 2010

(54) TIME BASE CORRECTION IN VIDEO SYSTEMS

(75) Inventors: Peter Chang, Hurst, TX (US); Rajitha Padakanti, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 953 days.

(21) Appl. No.: 11/135,724

(22) Filed: May 24, 2005

(65) Prior Publication Data

US 2006/0268172 A1 Nov. 30, 2006

(51) Int. Cl.
*H04N 9/475* (2006.01)
(52) U.S. Cl. .................. 348/512; 348/516; 348/521; 348/497
(58) Field of Classification Search .......... 348/500, 348/497–499, 536–543, 512–514, 516–517, 348/607; 386/85–91, 13–20; *H04N 9/475*
See application file for complete search history.

(56) References Cited

U.S. PATENT DOCUMENTS

| | | | | |
|---|---|---|---|---|
| 4,675,724 A | * | 6/1987 | Wagner | ........................ 348/498 |
| 5,121,207 A | * | 6/1992 | Herrmann | .................... 348/573 |
| 5,212,600 A | | 5/1993 | Kanota | |
| 5,359,366 A | * | 10/1994 | Ubukata et al. | .............. 348/536 |
| 5,600,379 A | | 2/1997 | Wagner | |
| 5,845,039 A | | 12/1998 | Ko et al. | |
| 6,297,849 B1 | * | 10/2001 | Stessen et al. | .............. 348/500 |
| 6,317,161 B1 | | 11/2001 | Renner et al. | |

OTHER PUBLICATIONS

McLean, A., et al., "A Broadcast Quality Video Processor With Integrated Time Base Correction," Mar. 1998, pp. 358-359, IEEE.

* cited by examiner

*Primary Examiner*—Trang U Tran
(74) *Attorney, Agent, or Firm*—John J. Patti; Wade J. Brady, III; Frederick J. Telecky, Jr.

(57) ABSTRACT

System and method for digitally correcting time base errors in video display systems. A preferred embodiment comprises 1) correcting time base errors in a first portion of a horizontal line of video information, wherein the first correcting makes use of an error estimate for the horizontal line of video information and a preceding horizontal line of video information, 2) correcting time base errors in a second portion of a horizontal line of video information, wherein the second correcting makes use of an error estimate for the horizontal line of video information, and 3) repeating the first correcting and the second correcting for remaining horizontal lines of video information in the digitized video signal.

22 Claims, 3 Drawing Sheets

TIME BASE CORRECTION IN VIDEO SYSTEMS

TECHNICAL FIELD

The present invention relates generally to a system and method for video display systems, and more particularly to a system and method for digitally correcting time base errors in video display systems.

BACKGROUND

A video signal is made up of multiple frames with each frame being made up of multiple horizontal lines of image information. The video signal can be very sensitive to errors in phase as well as frequency. Collectively, the phase error and the frequency error can be referred to as time base errors. The time base errors can manifest in a video image in the form of image tearing, image noise, chromatic distortion, image distortion, overall image instability, and so on. The time base errors can be seen as differences in duration and start/stop times for each horizontal line. It is possible to correct the time base error in a video signal using analog signal processing or digital signal processing techniques. A prior art analog error correction technique may involve the use of circuitry containing various delay lines that are used to alter the timing of the video signal. A prior art digital error correction technique can make use of an analog-to-digital converter (ADC) to convert the video signal into a digital stream and a digital-to-analog converter (DAC) to convert the digital stream back into an analog signal, with timing correction being implemented via adjustments to clocks controlling the operation of the ADC and/or DAC.

In situations wherein an analog video signal has been digitized using a sampling clock with a sampling frequency, $f_s$, any time base error present in the video signal can result in a differing number of samples in each horizontal line of the video signal as well as horizontal line start/stop times that differ from expected start/stop times. This is due to a sampling clock that remains constant while the analog video signal may contain time base errors.

In U.S. Pat. No. 5,600,379 (Wagner, issued Feb. 4, 1997), which is herein incorporated by reference, a technique for digitally correcting time base errors is presented using a sampling clock that is asynchronous with respect to a horizontal sync signal present in the video signal. A digitized version of the video signal is resampled using a sampling clock that resamples the digitized video signal by a specified factor that results in approximately 500 to 1200 resampled samples per horizontal line. The resampling can be performed using a running average of the horizontal sync frequency over a specified number of horizontal lines.

One disadvantage of the prior art is that the correction of errors in the time base occurs gradually over a number of periods. This gradual correction can result in errors remaining in the video signal longer than necessary and negatively impacting video images for an extended amount of time. A single large time base error can take a large number of periods to correct.

A second disadvantage of the prior art is that the use of the running average can mask out the effect of large time base errors if they occur relatively infrequently or if there are complementary time base errors. The prior art technique may not be able to detect the occurrence of the error and permit the time base error to remain in the video signal.

SUMMARY OF THE INVENTION

These and other problems are generally solved or circumvented, and technical advantages are generally achieved, by preferred embodiments of the present invention which provides for a system and method for digitally correcting time base errors in video display systems.

In accordance with a preferred embodiment of the present invention, a method for time base error correcting a digitized video signal is provided. The method includes correcting time base errors in a first portion of a horizontal line of video information, where the first correcting makes use of an error estimate for the horizontal line of video information and a preceding horizontal line of video information. The method also includes correcting time base errors in a second portion of the horizontal line of video information, where the second correcting makes use of an error estimate for the horizontal line of video information. The method is repeated for remaining horizontal lines of video information in the digitized video signal.

In accordance with another preferred embodiment of the present invention, a time base error correcting system is provided. The time base error correcting system includes a video separator connected to a signal input, a timing sync unit also connected to the signal input, a processor connected to the timing sync unit, and a time base correction unit coupled to both the signal separator and the processor. The video separator separates a digitized video signal supplied by the signal input into component signals, while the timing sync unit provides synchronization information from the digitized video signal. The processor computes initialization and incremental values based upon the synchronization information and the time base correction unit selects pixels from the component signals and then resamples them.

In accordance with another preferred embodiment of the present invention, a time base error correcting system is provided. The time base error correcting system include a means for separating a digitized video signal into component signals, a means for providing time synchronization information for timing information present in the digitized video signal, a means for computing initialization and incremental values based upon time synchronization information, and a means for correcting time base errors by selecting pixels in the digitized video signal and resampling them.

An advantage of a preferred embodiment of the present invention is that the present invention may be readily added onto an existing video display system architecture. Therefore, the implementation of the present invention can be performed with little additional development time and cost.

A further advantage of a preferred embodiment of the present invention is that the time base correction is performed on baseband data so that a simple interpolation filter can provide sufficient performance. Furthermore, the present invention is scalable. Therefore, if a low-cost implementation is desired, the interpolation filter can be replaced with a simple software-based interpolation scheme. This will further reduce hardware development time and cost.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a video decoder for a video display system. The invention may also be applied, however, to video decoders for other types of video systems, such as video duplication systems, video conversion systems, video compression systems, and so forth.

Figure 1:
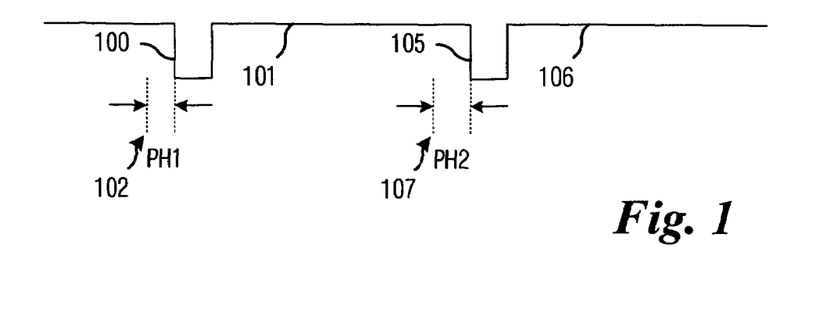
FIG. 1 is a diagram of an exemplary video signal.

With reference now to FIG. 1, there is shown a diagram illustrating a portion of an exemplary video signal. The diagram shown in FIG. 1 illustrates a two-horizontal-line portion of an exemplary video signal. Each horizontal line begins with a horizontal sync pulse, such as horizontal sync pulse 100 for horizontal line one 101 and horizontal sync pulse 105 for horizontal line two 106. A falling edge of the horizontal sync pulse 100 is typically accepted as the beginning of a horizontal line and the horizontal line continues until a falling edge of a subsequent horizontal sync pulse is received.

Due to the potential presence of time base errors in the video signal, there may be a difference between an expected time of a horizontal sync pulse and an actual time of a horizontal sync pulse. For example, a difference between an expected time of a horizontal sync pulse and an actual time of a horizontal sync pulse for horizontal sync pulse 100 may be displayed as interval 102 and referred to as phase error one (PH1) while interval 107 and phase error two (PH2) can illustrate a difference between an expected time of a horizontal sync pulse and an actual time of a horizontal sync pulse for horizontal sync pulse 105. The time base errors may be positive (when the expected time of a horizontal sync pulse is before the actual horizontal sync pulse) or negative (when the expected time of a horizontal sync pulse is after the actual horizontal sync pulse). Unless corrected, a time base error that occurs in a single horizontal line can perpetuate in subsequent horizontal lines.

Figure 2:
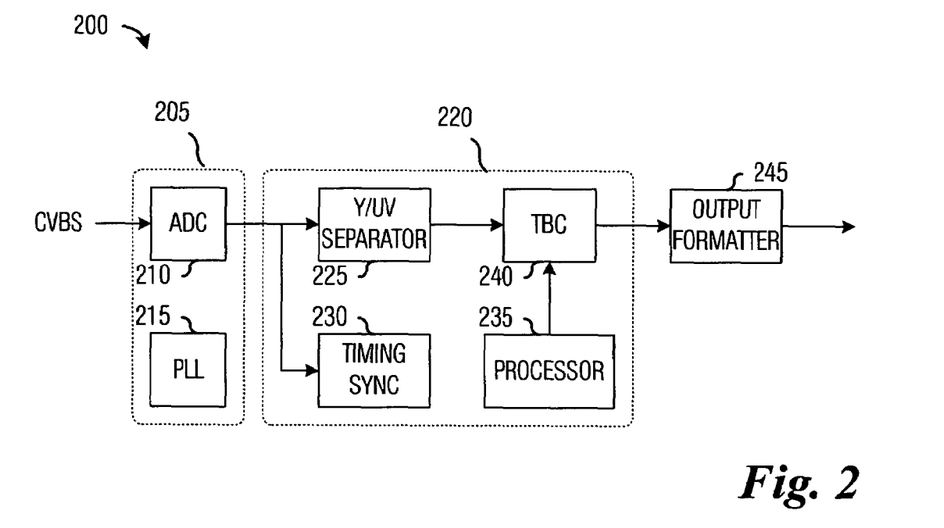
FIG. 2 is a diagram of a system for correcting time base errors, according to a preferred embodiment of the present invention.

With reference now to FIG. 2, there is shown a diagram illustrating a system 200 for correcting time base errors, according to a preferred embodiment of the present invention. The system 200 can take, as input, a video signal and produce at an output a time base corrected video signal. The system 200 comprises an analog circuitry and timing block 205 and a digital circuitry block 220. The analog circuitry and timing block (ACT) 205 may be responsible for operations such as converting an analog video signal, such as a composite video broadcast signal (CVBS), into a digitized video signal as well as providing timing information for the remainder of the system 200 derived from the analog video signal. The conversion from the analog video signal to a digital video signal may be performed by an analog-to-digital converter (ADC) 210 and a phase-locked loop (PLL) 215 can be used to provide timing information.

The digital circuitry block 220 may be responsible for correcting time base errors in the digital video signal, among other responsibilities. A Y/UV separator unit 225 can be used to separate luma and chroma signals present in the digital video signal that is provided by the ADC 210. The separation of the luma and chroma components of the digital video signal can permit further processing of the components. A timing synchronization unit 230 can make use of timing information present in the digital video signal, as well as timing information from the PLL 215, to provide timing synchronization signals, such as those related to the horizontal sync pulses present in the digital video signal. A processor 235 can be used to implement timing correction algorithms, a horizontal PLL (HPLL), and so forth, while a time base correction (TBC) unit 240 can be used to perform the actual correction of the time base errors present in the digital video signal using timing information provided by the processor 235. The HPLL may be a software routine used to permit the tracking of horizontal sync pulses in the video signal. A locked HPLL can provide timing information for a pixel clock, which can be used in the time base error correction (pixel selection and resampling) of a horizontal line. An output formatter 245 can be used to perform any necessary operations on the time base corrected digital video signal to put the digital video signal into a proper format for display, conversion, compression, copying, and so forth.

Figure 3:
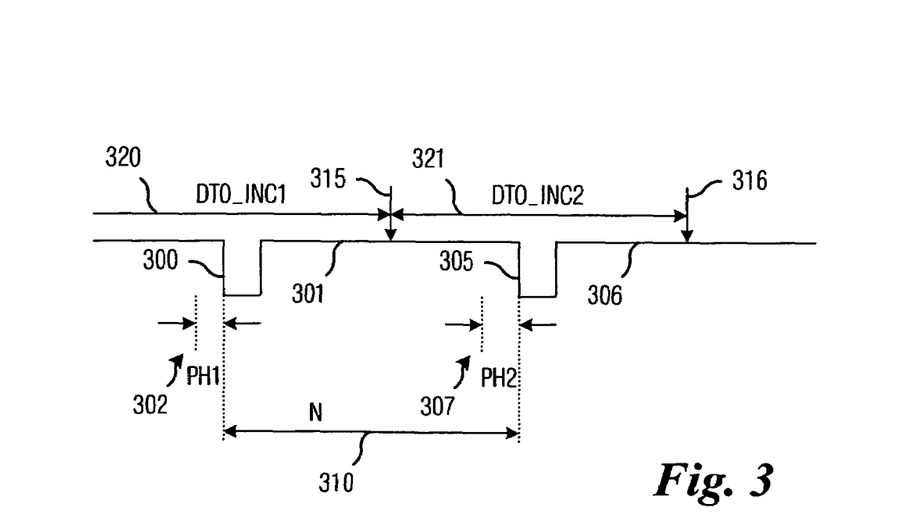
FIG. 3 is a diagram of a video signal with annotation, according to a preferred embodiment of the present invention.

With reference now to FIG. 3, there is shown a diagram illustrating a portion of a video signal with different portions of the video signal being annotated, according to a preferred embodiment of the present invention. The annotations illustrate values used in the correction of time base errors present in a video signal. The diagram shown in FIG. 3 illustrates a two-horizontal-line portion of a video signal. For each horizontal line, there is a horizontal sync pulse. For example, horizontal sync pulse 300 corresponds to horizontal line 301 and horizontal sync pulse 305 corresponds to horizontal line 306. A time base error present in the horizontal line 301 is shown as an interval 302 and labeled 'PH1' while an interval 307 (labeled 'PH2') represents a time base error present in the horizontal line 306. The time base error (in this instance, referred to as a phase error) can be determined shortly after the arrival of a horizontal sync pulse. For example, the time base error for the horizontal line 301 (PH1) can be determined shortly after the horizontal sync pulse 300 arrives.

For each horizontal line, such as the horizontal line 301, there is a fixed number of pixels, N. This is shown in FIG. 3 as interval 310. Some of the pixels in a single horizontal line may not be displayed. For example, portions of a horizontal line may include information pertaining to a blanking period, both horizontal and vertical. A value that can be defined as a pixel count from a horizontal sync pulse to when the HPLL becomes updated is referred to as 'P' and is shown in FIG. 3 as marker 315 for the horizontal line 301 and as marker 316 for horizontal line 306. For example, for pixels in the horizontal line 301 prior to the marker 315, the HPLL has not been updated, while for pixels after the marker 315, the HPLL has been updated. Once the HPLL is updated, a new estimate of the time base error present in the current horizontal line, such as the horizontal line 301, can be computed. Information provided by the HPLL can also be used to adjust a pixel clock. For the horizontal line 301, the error estimate is an estimate of the time base error PH1. The value of P can differ for different horizontal lines, but typically will remain constant. A pair of frequency control words 'DTO_INC1' and 'DTO_INC2,' define digital time oscillator increments (adjustments) for horizontal lines, with DTO_INC1 defining increments for a preceding horizontal line (such as a partial horizontal line shown preceding the horizontal line 301) and DTO_INC2 defining increments for a current horizontal line (such as the horizontal line 301). The update of the HPLL can provide updates for timing information such as DTO_INC1 and DTO_INC2 among other values.

The computation of the frequency control words can be based upon values provided by the HPLL and therefore can change when the HPLL becomes updated (for example, at marker 315). Intervals 320 and 321 indicate portions of the video signal when frequency control words DTO_INC1 and DTO_INC2 are valid. For the current horizontal line (such as the horizontal line 301), the frequency control word DTO_INC1 is valid between a marker (not shown) of a preceding horizontal line and the marker 315 of the current horizontal line (shown as interval 320), while the frequency control word DTO_INC2 is valid between the marker 315 and the marker 316 (shown as interval 321). The frequency control words can be computed in the processor 235 (FIG. 2) using timing information provided by the HPLL.

Figure 4:
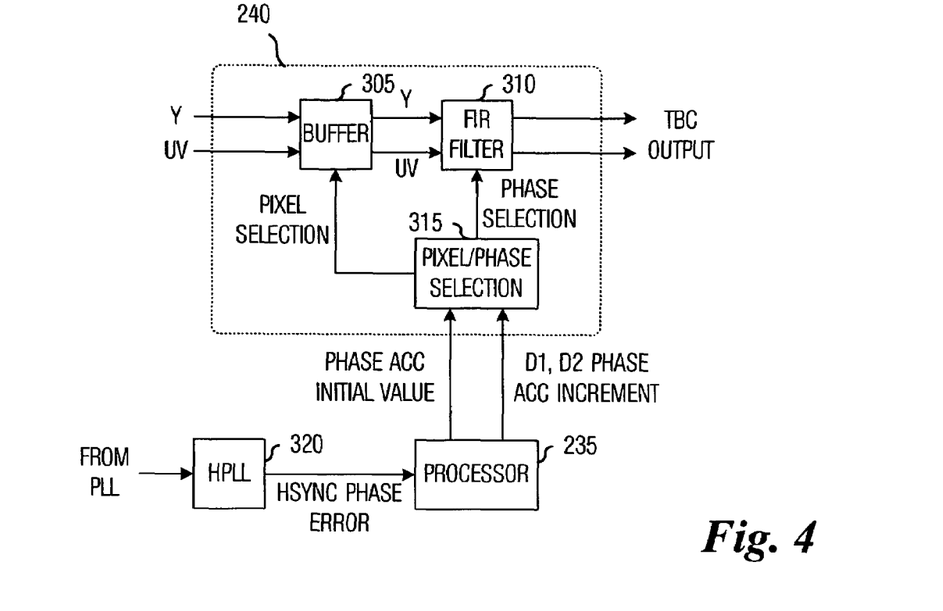
FIG. 4 is a diagram of a detailed view of the processor and the TBC and their use in correcting time base errors, according to a preferred embodiment of the present invention.

With reference now to FIG. 4, there is shown a diagram illustrating a detailed view of the processor 235 and the TBC 240 and their functional blocks for use in correcting time base errors, according to a preferred embodiment of the present invention. The TBC 240 includes a buffer 305 that can be used to store samples of horizontal line pixel information in the video signal as provided by the Y/UV separator 225 (FIG. 2). Buffer size can be a limit upon a range of possible jitter correction. For example, if 80 pixels is a preferred number of pixels, then a good buffer size may be 80 pixels+80 pixels+X pixels, wherein X is a number that can be related to an expected (or permitted) frequency deviation in the video signal. Simulation and actual implementation studies have shown that X=100 (yielding a buffer of size 260) provides good performance in typical video systems while permitting a relatively small buffer size. To further simplify buffer design, a buffer of size 256 can yield similar performance results.

The TBC 240 also includes a finite impulse response (FIR) filter 310 to perform a resampling of the video signal. According to a preferred embodiment of the present invention, the FIR filter 310 may be a polyphase FIR filter with thirty-two (32) sets of filter coefficients. The actual number of sets of filter coefficients can differ depending upon a desired resolution for the resampling of the pixel. For each pixel being corrected, a selection of one of the 32 sets of filter coefficients can be made and provided to the FIR filter 310. Each of the sets of filter coefficients has a different group delay and the different group delays perform the resampling (retiming) of the pixel. The pixel can then be filtered by the FIR filter 310. The filter coefficients may be stored in an indexed table or memory. The indexing can allow for rapid retrieval of any of the filter coefficient sets for use in the FIR filter 310. For example, to retrieve filter coefficient set number #5, table entry #5 or memory entry #5 can be accessed to retrieve the filter coefficients. The use of an indexed table or memory for storage of the filter coefficient sets can allow for easy modification in the number of filter coefficient sets while maintaining a constant level of performance (access and retrieval times of filter coefficient sets will remain substantially the same regardless of the size of the indexed table or memory).

The TBC 240 also features a pixel/phase selection unit 315 that can be used to select a single pixel out of a plurality of pixels stored in the buffer 305. The pixel/phase selection unit 315 can also be used to select the filter coefficient set for the FIR filter 310. Input to the pixel/phase selection unit 315 can include a variety of timing related information from the processor 235. The timing related information can include an initial value for a phase accumulator and phase accumulator increment values for portion of horizontal line prior to and after the update of the HPLL in the processor 235. The pixel/phase selection unit 315 can include a phase accumulator (not shown) that can be used to maintain pixel selection and phase selection information as the pixel/phase selection unit 315 processes the pixels of the horizontal line. According to a preferred embodiment of the present invention, the phase accumulator may be implemented as a memory location with a first number of bits dedicated to pixel number and a second number of bits dedicated to filter coefficient set index. For example, a relatively simple implementation of the phase accumulator may make use of a real number representation of a number, wherein an integer portion of the number can represent a pixel number to be selected out of the buffer 305 while a fractional portion of the number can represent a filter coefficient set index to be provided to the FIR filter 310.

The processor 235 can be a general purpose microprocessor, such as an advanced RISC machine (ARM) microprocessor. Other processors can be used in place of the ARM microprocessor, such as a digital signal processor (DSP) or an application specific integrated circuit. An HPLL block 320 can implement the HPLL algorithm using hardware, software, or a combination of both hardware and software. Alternatively, the processor 235 may implement an algorithmic implementation of the HPLL algorithm. Additionally, the processor 235 may be used to perform computations, such as those needed to compute initial phase accumulator values, phase accumulator increment values, and so forth from a horizontal sync error provided by the HPLL block 320. A detailed description of the function of the TBC 240 and the processor 235 pertaining to the function of the TBC 240 is provided below.

Figure 5:
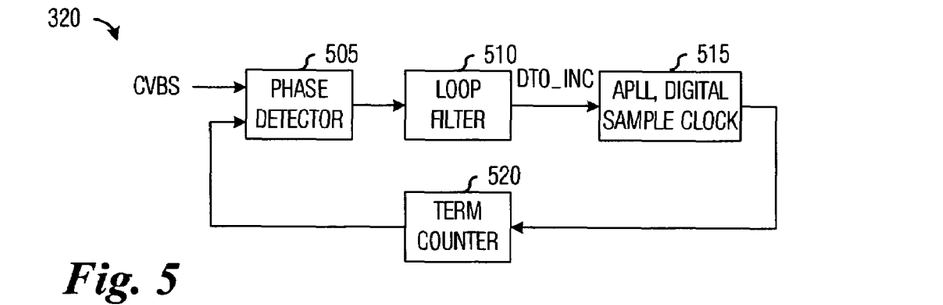
FIG. 5 is a diagram of a detailed view of an HPLL block, according to a preferred embodiment of the present invention.

With reference now to FIG. 5, there is shown a diagram illustrating a detailed view of the HPLL block 320, according to a preferred embodiment of the present invention. As discussed above, the HPLL block 320 can be used to provide a horizontal sync phase error signal to the processor 235, which can use the error signal to compute initial and incremental values for the phase accumulator in the TBC 240. The HPLL block 320 can include a phase detector 505 used to compare two signals at its inputs and provide an error signal that is indicative of a difference (if any) present between the two signals. The error signal can then be filtered by a loop filter 510 to help eliminate noise or to provide frequency shaping. According to a preferred embodiment of the present invention, the loop filter 510 can be implemented in software.

Output of the loop filter 510, the signal DTO_INC, which is a filtered error signal representing a phase difference between the input signal (the video signal) and a sample clock, can be provided to an analog PLL and sample clock block 515. The analog PLL and sample clock block 515 can be used to provide an adjustable clock for timing the conversion of the ADC 210 (FIG. 2). Depending on the output of the loop filter 510, the sample clock can be adjusted to reduce the filtered error signal. A term counter 520 can be used to permit the sample clock to operate at multiples of a clock signal present in the video signal (the horizontal sync pulses).

Figure 6:
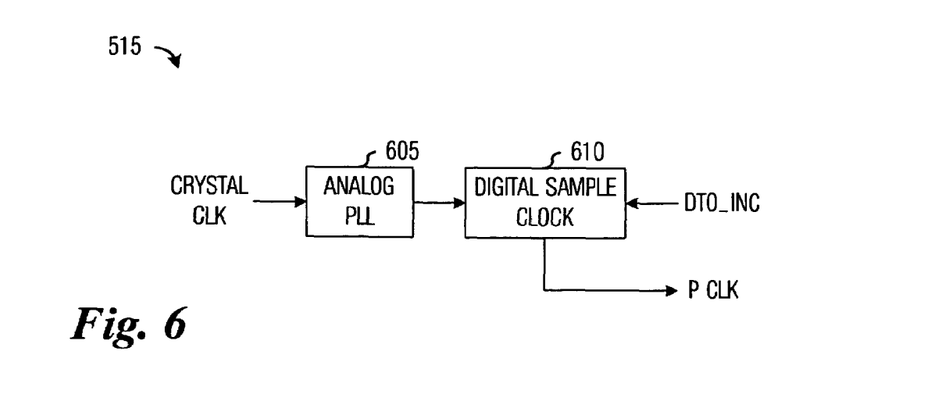
FIG. 6 is a diagram of a detailed view of the analog PLL and sample clock block, according to a preferred embodiment of the present invention.

With reference now to FIG. 6, there is shown a diagram illustrating a detailed view of the analog PLL and sample clock block 515, according to a preferred embodiment of the present invention. The circuit 515 can include an analog PLL 605 with a clock signal generated by a crystal as one input. The analog PLL 605 may be one of a wide variety of standard analog PLLs currently available or it may be a specially designed PLL. Output from the analog PLL 605 can be provided to a digital sample clock 610, which can be used to generate a sample clock used to time the sampling of the video signal by the ADC 210 (FIG. 2). For example, the output of the analog PLL 605 may provide a basis for the digital sample clock 610 and can be used to generate the sample clock, which can be a fraction of the output of the analog PLL 605, with the resolution of the sample clock being dependent on the timing information provided by the HPLL, such as a fractional part of DTO_INC1 and DTO_INC2. Another input to the digital sample clock 610 is the output of the loop filter 510 (FIG. 5). The output of the loop filter 510 can be used to make timing adjustments to the sample clock produced by the digital sample clock 610, with the sample clock being referred to as a pixel (or P) clock.

Figure 7A:
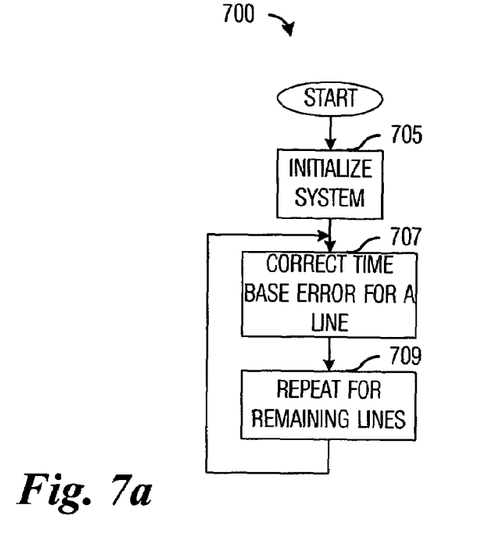
FIGS. 7a through 7c are diagrams of an algorithm for use in correcting time base errors in a video signal, according to a preferred embodiment of the present invention.
Figure 7B:
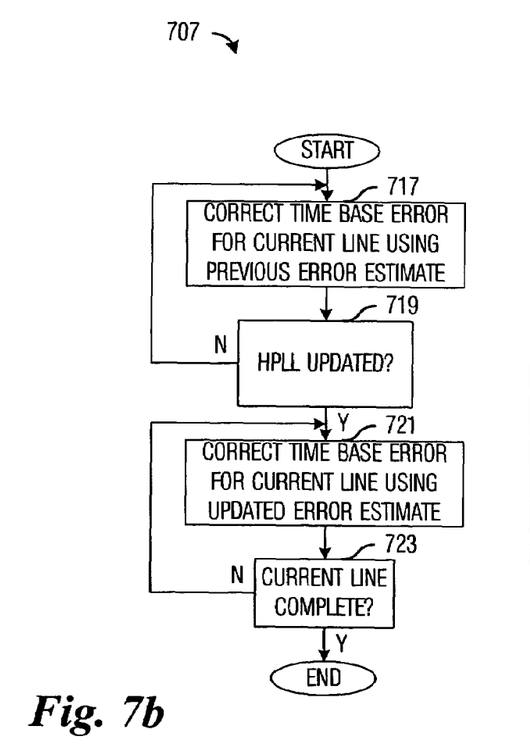
Figure 7C:
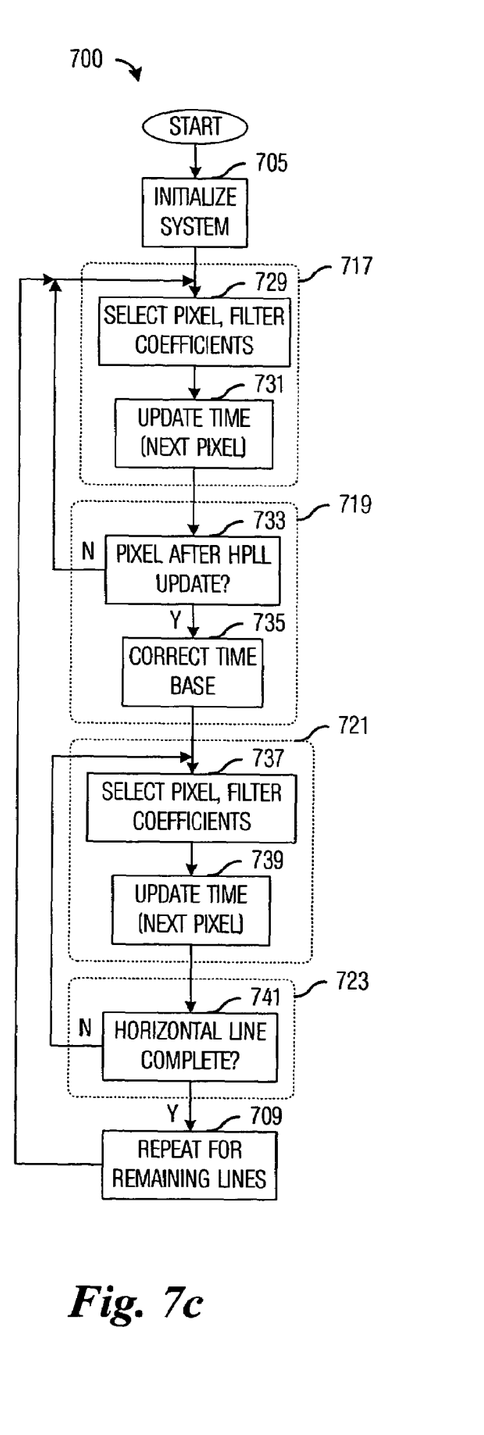

With reference now to FIGS. 7a through 7c, there are shown diagrams illustrating an algorithm for use in correcting time base errors in a video signal, according to a preferred embodiment of the present invention. In FIG. 7a, there is shown an algorithm 700 for use in correcting time base errors in a video signal. The FIG. 7a provides a high-level view of the time base error correction in algorithm 700. According to a preferred embodiment of the present invention, the algorithm 700 may be descriptive of operations taking place in a pixel/phase selection unit of a TBC of a video system, such as the pixel/phase selection unit 315 (FIG. 3) of the TBC 240 (FIG. 2). Prior to correcting time base errors, the pixel/phase selection unit 315, the TBC 240, and the entire video system may undergo an initialization (block 705). The initialization may include the resetting of various circuits, clearing registers and memories, retrieving configuration information for circuits, and so forth. The initialization may take place at power up, after a system reset, after the execution of a reset instruction, and so on. After system initialization, the pixel/phase selection unit 315 can begin correcting time base errors by correcting time base errors for a horizontal line of an image at a time (block 707). The time base error correction may take place on a pixel by pixel basis. Once a horizontal line has been time base corrected, the pixel/phase selection unit 315 can repeat the correction for remaining horizontal lines in the video signal (block 709). The correction can continue until the video signal is stopped or until the video system is turned off.

With reference now to FIG. 7b, a detailed view of the correction of time base errors for a single horizontal line (block 707) is illustrated. As discussed previously, a horizontal line of an image begins with a horizontal sync pulse and a time base error that manifests as a difference between an expected arrival time of the horizontal sync pulse and an actual arrival time of the horizontal sync pulse. Once the horizontal sync pulse appears, pixel information for the horizontal line follows. According to a preferred embodiment of the present invention, for the pixels in a horizontal line (referred to as a current horizontal line) that are to be time base error corrected prior to an update of the HPLL for the horizontal line, the error correction can be made using the phase error estimate of the current line and frequency error estimates from a horizontal line immediately preceding the current horizontal line. In other words, the error correction for portions of the current horizontal line prior to the HPLL update for the current horizontal line makes use of a pixel clock running at a rate determined for the previous horizontal line. Rather than using the error estimate for the horizontal line immediately preceding the current horizontal line, an average of the error estimates for a plurality of horizontal lines immediately preceding the current horizontal line can be used. A simple arithmetic average can be used or a weighted average can be used. The number of preceding horizontal lines used in the computation of the average can be dependant upon factors such as video signal stability, computational power available in the video system, available storage space, and so forth.

Using the error estimate of the time base error (the horizontal sync phase error) for the current horizontal line and a succeeding horizontal line, time base error correction for the current horizontal line can be performed. In order to determine the time base error of the succeeding horizontal line, it may be necessary to save (delay) the current horizontal line until the error estimate of the succeeding horizontal line is processed. Two sets of time base correction parameters (including the error estimate) will be computed for the portions of the current horizontal line before and after the HPLL is updated (or equivalently the update of the pixel clock frequency). According to a preferred embodiment of the present invention, at the beginning of the current horizontal line, the first set of the time base correction parameters will be used. The time base error correction proceeds on a pixel by pixel basis and comprises selecting a pixel from a buffer of the video signal (such as the buffer 305 (FIG. 4)) and then resampling the pixel with a filter (such as the polyphase FIR filter 310 (FIG. 4)) to retime the pixel (block 717). After completing one pixel, a check can be performed to determine if the HPLL has been updated for the current horizontal line (block 719). If the HPLL has not been updated, then the pixel/phase selection unit 315 can return to block 717 to correct another pixel.

If the HPLL has been updated, then the pixel/phase selection unit 315 can begin to correct pixels for the current horizontal line using the second set of the time base correction parameters. As discussed above, the correction of the pixel involves selecting a pixel and then resampling it with the filter. The pixel/phase selection unit 315 continues correcting pixels for the remainder of the current horizontal line by checking if the current horizontal line is complete (block 723) and returning to block 721 to correct another pixel if the current horizontal line is not complete. It may not be necessary to perform error correction on all information in the current horizontal line. Each horizontal line may also contain information that is not typically displayed. This information may include a blanking period, both horizontal and vertical. Therefore, processing time and resources can be saved if this information is not error corrected.

With reference now to FIG. 7c, a detailed view of the algorithm 700 for use in error correction of time base errors in a video signal is illustrated. Besides resetting system hardware, memory locations, and so forth, the initialization of the video system (block 705) can include the computation and definition of values that will be used during the correction of time base errors in the video signal. For a situation when the HPLL has not been updated for a current horizontal line, values that need pre-computation can include: ACC (an initial value of a phase accumulator), D1 (a phase increment for the phase accumulator prior to the update of the HPLL for the current horizontal line), and t1 (pixel clock period prior to the update of the HPLL for the current horizontal line). After the HPLL has been updated for the current horizontal line, values that need pre-computation can include: D2 (a phase increment for the phase accumulator after the update of the HPLL for the current horizontal line), t2 (pixel clock period after the update of the HPLL for the current horizontal line), and ratio (ratio of D2 to D1 or t1 to t2). Since there is a one horizontal line delay (due to the use of timing information from a succeeding horizontal line in the pixel and filter coefficient set selection for the current horizontal line) between the time that the pre-computations are made and the time that the pre-computations are actually used by the TBC 240, the pre-computed values can be stored in a temporary storage location (registers or memory) and then can be loaded into active registers when the horizontal line for which they are computed begins to be processed.

According to a preferred embodiment of the present invention, the pre-computed values can be expressed as follows:

t1=k*(DTO_INC1+DTO_OFFSET); where k is a proportionality constant, DTO_INC1 is a digital time oscillator increment for the portion of a horizontal line before the HPLL is updated, and DTO_OFFSET is a constant based upon a frequency characteristic of the HPLL.

t2=k*(DTO_INC2+DTO_OFFSET); where DTO_INC2 is a digital time oscillator increment for the portion of a horizontal line after the HPLL is updated, and DTO_OFFSET is a constant based upon a frequency characteristic of the HPLL.

D1=t/t1=(N1*t1+N2*t2)/N; where N is the number of pixels per horizontal line, N1 is the number of pixels between a horizontal sync pulse and a pixel when the HPLL is updated, and N2 is the number of pixels between a pixel when the HPLL is updated to the horizontal sync pulse of a subsequent horizontal line.

D2=t/t2=(N*t1+N2*t2)/(N*t2);

ACC=S*D1+PH1; where S is a pixel number of the start of active pixels in a horizontal line and PHI is the time base error of a current horizontal line.

ratio=t1/t2=D2/D1=(1−(Δ2−Δ1)/DTO_OFFSET); where Δ1 is DTO_INC1 and Δ2 is DTO_INC2.

After initializing the video system, the pixel/phase selector unit 315 can perform error correction for the current horizontal line after two horizontal lines of the video signal have been received, wherein the pixels being error corrected are from a portion of the current horizontal line prior to when the HPLL has been updated (block 717). The error correction comprises selecting a pixel and a set of polyphase FIR filter coefficients (block 729) and updating pixel time, and makes use of the first set of time base correction parameters (block 731). The selection of the pixel and the set of polyphase FIR filter coefficients can be performed based upon a numerical value stored in the phase accumulator. According to a preferred embodiment of the present invention, the phase accumulator (located in the pixel/phase selector unit 315) can be used to store a real number and an integer portion of the real number can represent a pixel to select from the buffer 305 (FIG. 4) and a fractional portion of the real number can be an index to a set of filter coefficients. After the pixel has been selected and has been provided to the polyphase FIR filter 310 for resampling (block 729), the pixel time can be updated (block 731). The updating of the pixel time can involve the addition of the phase increment for the phase accumulator prior to the update of the HPLL (D1) to the contents of the phase accumulator.

As an example of the pixel and phase selection, let the phase increment (D1) be equal to 1.25 and an initial value for the phase accumulator be equal to 2.00. On a first iteration through the algorithm 700, the pixel/phase selector unit 315 can select pixel number 2 (the integer portion of the phase accumulator) and a set of filter coefficients corresponding to a 0.00 value (the fractional portion of the phase accumulator). Then, on a second iteration through block 717, the pixel/phase selector unit 315 can select pixel number 3 and a set of filter coefficients corresponding to a 0.25 value (the phase accumulator is equal to 3.25 (2.00+1.25)). On a third iteration through block 717, the phase accumulator is equal to 4.5 and the pixel/phase selector unit 315 can select pixel number 4 and a set of filter coefficients corresponding to a 0.50 value.

After updating the pixel time, the pixel/phase selector unit 315 can check to determine if the next pixel to be selected will occur after the HPLL update (block 733). This may be performed by simply checking the integer portion of the phase accumulator and comparing it with a pixel number representing a time when the HPLL update occurs. If the next pixel to be selected occurs before the update of the HPLL for the current horizontal line, then the pixel/phase selector unit 315 can return to block 729 to select the next pixel along with a set of filter coefficients. If the next pixel to be selected occurs after the update of the HPLL for the current horizontal line, then the pixel/phase selector unit 315 can perform a correction of the time base (block 735). The correction of the time base can be performed by making an adjustment to the value stored in the phase accumulator and can be performed in the following steps:

Correction=ACC−P; return to initial value of phase accumulator; where P is the pixel number corresponding to a time when the HPLL for the current horizontal line is updated.

Correction=Correction*ratio; adjust time base.

ACC=P+Correction; return to current pixel time.

After correcting the time base (block 735), the pixel/phase selector unit 315 can continue to perform error correction for the current horizontal line with the second set of time base correction parameters (block 721). The error correction comprises selecting a pixel and a set of polyphase FIR filter coefficients (block 737) and updating pixel time (block 739). The selection of the pixel and the set of polyphase FIR filter coefficients can be performed based upon a numerical value stored in the phase accumulator. According to a preferred embodiment of the present invention, the phase accumulator (located in the pixel/phase selector unit 315) can be used to store a real number and an integer portion of the real number can represent a pixel to select from the buffer 305 (FIG. 4) and a fractional portion of the real number can be an index to a set of filter coefficients. After the pixel has been selected and has been provided to the polyphase FIR filter 310 for resampling (block 737), the pixel time can be updated (block 739). The updating of the pixel time can involve the addition of the phase increment for the phase accumulator after the determination of the error estimate for the current horizontal line (D2) to the contents of the phase accumulator.

After updating the pixel time, the pixel/phase selector unit 315 can check to determine if all of the current horizontal line has been error corrected (block 741). The pixel/phase selector unit 315 may not have to error correct all of the pixels in the current horizontal line. After the error correction of the current horizontal line is completed, the pixel/phase selector unit 315 can repeat for remaining lines (block 709).

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving a digital video signal;
   correcting time base errors in a first portion of each horizontal line of video information from the digital video signal by using an error estimate for the corresponding horizontal line of video information and a preceding horizontal line of video information; and
   correcting time base errors in a second portion of each horizontal line of video information from the digital video signal by using an error estimate for the corresponding horizontal line of video information.

2. The method of claim 1, wherein the first portion comprises a beginning of the corresponding horizontal line of video information to a pixel corresponding to a time when the error estimate for the corresponding horizontal line of video information is determined, and wherein the second portion comprises the pixel to an end of the corresponding horizontal line of video information.

3. The method of claim 1, wherein each of the steps of correcting are performed on individual pixels of the corresponding horizontal line of video information.

4. The method of claim 1, wherein the method further comprises the steps of initializing a phase accumulator to a value computed based upon the error estimate for the horizontal line of video information and the preceding horizontal line of video information before the steps of correcting time base errors in the first portion of each horizontal line of video information from the digital video signal by using an error estimate for the corresponding horizontal line video information and a corresponding preceding horizontal line of video information.

5. The method of claim 4, wherein the step of correcting time base errors in the first portion of each horizontal line of video information from the digital video signal by using an error estimate for the corresponding horizontal line of video information and a corresponding preceding horizontal line of video information further comprises:
   selecting a pixel number and a filter coefficient set number based upon a value in the phase accumulator; and
   updating the value in the phase accumulator.

6. The method of claim 5, wherein the step of updating further comprises adding a phase increment to the value stored in the phase accumulator.

7. The method of claim 6, wherein the phase increment is based upon the error estimate for the corresponding horizontal line of video information and the preceding horizontal line of video information.

8. The method of claim 5, wherein the phase accumulator stores a real number, and wherein an integer portion of the real number comprises the pixel number, and wherein a fractional portion of the real number comprises the filter coefficient set number.

9. The method of claim 8, wherein the step of correcting time base error in the first portion of each horizontal line of video information form the digital video signal by using an error estimate for the corresponding horizontal line of video information and a corresponding preceding horizontal line of video information is repeated until the integer portion of the phase accumulator exceeds a pixel that corresponds to a time when the error estimate for the horizontal line of video information is determined, and wherein the step of correcting time base errors in a second portion of each horizontal line of video information form the digital video signal by using an error estimate for the corresponding horizontal line of video information is repeated until the integer portion of the phase accumulator exceeds the last pixel in the horizontal line of video information.

10. The method of claim 4, wherein the step of correcting time base errors in a second portion of each horizontal line of video information from the digital video signal by using an error estimate for the corresponding horizontal line video information further comprises:
    selecting a pixel number and a filter coefficient set number based upon a value in the phase accumulator; and
    updating the value in the phase accumulator.

11. The method of claim 10, wherein the phase increment is based upon the error estimate for the horizontal line of video information.

12. The method of claim 10 further comprising after the first correcting, adjusting a time base of the value in the phase accumulator.

13. The method of claim 4, wherein the phase accumulator is re-initialized for each horizontal line.

14. A time base error correcting system comprising:
    a signal separator coupled to a signal input, wherein the signal separator configured to separate a digitized video signal provided by the signal input into component signals;
    a timing sync unit coupled to the signal input, wherein the timing sync unit configured to provide synchronization information from the digitized video signal;
    a processor coupled to the timing sync unit, wherein the processor computes an initial value of a phase accumulator, a first phase accumulator increment values, and a second phase accumulator value, and wherein the first phase accumulator increment value corresponds to a portion of a current horizontal line making use of an error estimate for the current horizontal line and a previous horizontal line, and wherein the second phase accumulator value corresponds to a portion of the current horizontal line making use of a error estimate from the current horizontal line; and
    a time base correction (TBC) unit coupled to the signal separator and the processor, the TBC unit configured to select pixels from the component signals and to resample the selected pixels.

15. The time base error correcting system of claim 14, wherein the error estimate is based upon timing information provided by a horizontal sync phase lock loop unit.

16. The time base error correcting system of claim 14, wherein the TBC unit further comprises:
- a buffer coupled to the signal separator, the buffer to store a portion of the component signals;
- a filter coupled to the buffer, the filter configured to resample a selected pixel from the buffer; and
- a pixel/phase selector unit coupled to the filter and the buffer, the pixel phase selector unit configured to select a pixel from the buffer and to provide a set of filter coefficients to the filter based upon error estimates provided by the processor.

17. The time base error correcting system of claim 16, wherein the filter further comprises a polyphase finite impulse response (FIR) filter, wherein the filter further comprises a memory configured to store a plurality of sets of filter coefficients, and wherein the pixel/phase selector unit provides to the filter an index used to reference a set of filter coefficients.

18. The time base error correcting system of claim 14, wherein the system further comprises an analog-to-digital converter (ADC) having an input coupled to an analog video signal source and an output coupled to the signal input, the ADC configured to sample an analog video signal at a sampling rate that is adjusted based upon an error estimate.

19. An apparatus comprising:
- a signal separator coupled to a signal input, wherein the signal separator receives a digitized video signal;
- a timing sync unit coupled to the signal input;
- a processor coupled to the timing sync unit, the processor includes a computer program product embodied thereon, and wherein the computer program product includes
  - computer code for computing a first phase accumulator increment values, wherein the first phase accumulator increment value corresponds to a portion of a current horizontal line making use of an error estimate for the current horizontal line and a previous horizontal line; and
  - computer code for computing a second phase accumulator value, wherein the second phase accumulator value corresponds to a portion of the current horizontal line making use of an error estimate from the current horizontal line; and
- a TBC unit coupled to the signal separator and the processor.

20. The apparatus of claim 19, wherein the apparatus further comprise an ADC that is coupled to the signal separator and that generates the digitized video signal.

21. The apparatus of claim 19, wherein the TBC unit further comprises:
- a buffer coupled to the signal separator, the buffer to store a portion of the component signal;
- a filter coupled to the buffer, the filter configured to resample a selected pixel from the buffer; and
- a pixel/phase selector unit coupled to the filter and the buffer, the pixel phase selector unit configured to select a pixel from the buffer and to provide a set of filter coefficients to the filter based upon error estimates provided by the processor.

22. The apparatus Of claim 16, wherein the filter further comprises a polyphase FIR filter, wherein the filter further comprises a memory configured to store a plurality of sets of filter coefficients, and wherein the pixel/phase selector unit provides to the filter an index used to reference a set of filter coefficients.

* * * * *

UNITED STATES PATENT AND TRADEMARK OFFICE
CERTIFICATE OF CORRECTION

PATENT NO. : 7,649,569 B2
APPLICATION NO. : 11/135724
DATED : January 19, 2010
INVENTOR(S) : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1275 days.

Signed and Sealed this

Twenty-eighth Day of December, 2010

David J. Kappos
*Director of the United States Patent and Trademark Office*